MOWING MACHINES

Filed Oct. 17, 1966 2 Sheets-Sheet 1

Inventor
James Neville Brade
By
Norris & Bateman
Attorneys

*Inventor*

*James Neville Brade*

By

*Norris & Bateman*

*Attorneys*

United States Patent Office 3,483,681
Patented Dec. 16, 1969

3,483,681
MOWING MACHINES

James Neville Brade, Ormskirk, England, assignor to Harrison, McGregor and Guest Limited Filed Oct. 17, 1966, Ser. No. 587,068
Claims priority, application Great Britain, Nov. 13, 1965, 48,301/65
Int. Cl. A01d *67/00*
U.S. Cl. 56—25 8 Claims

ABSTRACT OF THE DISCLOSURE

A mowing machine comprises a frame, a knife-bar bed hinged to the frame, a knife-bar reciprocable on the bed, a hydraulic motor mounted on the machine and drivably connected to the knife-bar, a hydraulic jack for raising the machine, a hydraulic circuit connecting the hydraulic motor and the hydraulic jack in series, and means operable automatically when the supply of oil under pressure is cut off for positively locking oil under pressure within the hydraulic jack.

The invention relates to an improvement in or modification of that forming the subject of our prior patent application No. 411,481, now U.S. Letters Patent No. 3,374,610 issued Mar. 26, 1968.

In the specification lodged in pursuance of said application there is described a mowing machine of the reciprocating knife-bar type, for mounting on an agricultural tractor having a hydraulic mechanism, comprising a hydraulic motor and a hydraulic jack adapted to be connected to the tractor hydraulic mechanism so as to complete a hydraulic circuit wherein said hydraulic motor is connected drivably to the knife-bar, and said hydraulic jack is adapted to raise the machine, and wherein the machine further comprises means for causing the oil discharged by the motor to actuate the jack or for causing said oil and any oil contained in the jack to flow freely to exhaust when the circuit is completed. In a preferred embodiment of the mowing machine said means comprise a manually operable slide valve and there is also provided a relief valve which opens against the action of a spring when the pressure in the hydraulic jack attains a determined value. Thus if the machine is raised clear of the ground and the supply of oil under pressure is cut off, the machine should stay in raised position provided that the tractor does not jolt. In practice, however, jolting inevitably occurs when the tractor is driven over uneven ground. Provision for securing the machine in raised position is therefore made in the form of a mechanical device consisting of a chain link which can be placed manually over a pin. In the absence of some such mechanical device, jolting of the tractor would produce pressure surges within the hydraulic jack which would cause the relief valve to open intermittently so that the jack gradually emptied and the machine dropped to the ground.

The object of the present invention is to simplify the securing of the machine in raised position.

The invention is characterized by the improvement in or modification of the invention claimed in our prior application for Patent No. 411,481 according to which means are provided for positively locking oil under pressure within the hydraulic jack. Preferably, said means are operable only when the supply of oil under pressure from the tractor hydraulic mechanism is cut off. Preferably, also, said means comprise a non-return valve forming part of valve means comprising a supply port communicating with the inlet of the hydraulic motor, a piston movable by oil pressure at the supply port to push the non-return valve off its seat against the action of a spring, a port on the downstream side of the non-return valve leading to the hydraulic jack, a spring closed maximum pressure relief valve, an exhaust port on the downstream side of the relief valve, a conduit connecting the outlet of the hydraulic motor to the upstream sides of the non-return valve and the relief valve, and a manually controlled valve for preventing or permitting the escape of oil from the conduit direct to the exhaust port.

In the accompanying drawings, which are by way of example only:

Figure 3:
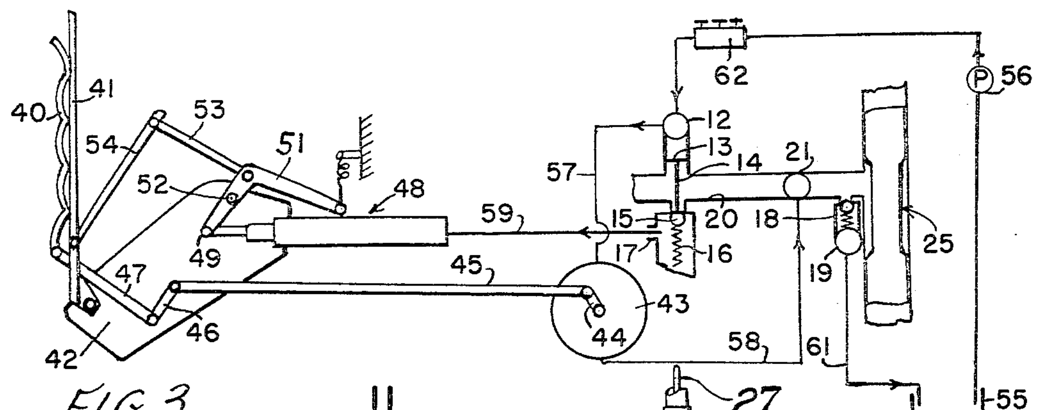
FIG. 3 is a diagrammatic view illustrating the valve means of FIGURE 1 in its preferred embodiment in a mowing machine.

In a preferred embodiment of the invention a mowing machine, for mounting on an agricultural tractor having a hydraulic mechanism, corresponds to the machine described and illustrated in our prior application for Patent No. 411,481 in so far as its mechanical components are concerned, but its hydraulic valve means are no longer built into the ram of the hydraulic jack. Instead there is secured to the hydraulic motor a valve block 10 (see FIG. 1) containing a supply port 11 communicating with the inlet 12 of the hydraulic motor, a piston 13 having an axially projecting pin 14 and movable by oil pressure at the supply port 11 to push a ball valve 15 which constitutes a non-return valve off its seat against the action of a spring 16, a port 17 on the downstream side of the ball valve 15, a spring closed maximum pressure relief valve 18, an exhaust port 19 on the downstream side of the relief valve 18, a conduit 20 connecting the outlet 21 of the hydraulic motor to the upstream sides of the ball valve 15 and the relief valve 18, and a slide valve 22 for preventing or permitting the escape of oil from the conduit 20 direct to the exhaust port 19. The slide valve 22 comprises lands 23 and 24 separated by a portion 25 of reduced diameter, and is biased towards the position shown in FIG. 1 by a spring 26. Said valve is operable by a Bowden cable 27 actuated by a hand lever (not shown) adapted to be secured on the tractor within reach of the driver, said hand lever being provided with a locking lever. A drain from the hydraulic motor opens directly into the exhaust port 19. Three flexible pipes are required—one adapted to connect the supply port 11 to a pressure outlet of the tractor hydraulic mechanism, another adapted to connect the exhaust port 19 to the sump of said mechanism, and a third connecting the port 17 to the hydraulic jack.

In operation, the hydraulic motor is actuated and the ball valve 15 is held off its seat by the pin 14 as long as oil under pressure is being delivered to the supply port 11 by the tractor hydraulic mechanism. When the slide valve 22 is in the position shown in FIG. 1, oil can flow from the outlet 21 of the hydraulic motor direct to the exhaust port 19 by way of the space surrounding the reduced diameter portion 25 of said valve, and the hydraulic jack also communicates freely with said port by way of the open ball valve 15, the conduit 20 and said space. Thus the machine is in working position with its knife-bar reciprocating at ground level. When the slide valve 22 is moved into the other of its operative positions, against the action of the spring 26, direct communication between the conduit 20 and the exhaust port 19 is blocked by the land 23 and oil can no longer flow freely from the outlet 21 of the motor to said port. Thus the oil discharged by the motor flows into the hydraulic jack by way of the open ball valve 15 so that the machine is raised clear of the ground whilst its knife-bar continues to reciprocate. When the pressure in the hydraulic jack and the conduit 20 reaches a determined value the relief valve 18 opens and oil can escape from the conduit 20 to the exhaust port 19 by way of said valve. If the supply of oil under pressure from the tractor hydraulic mechanism is now cut off, the hydraulic motor will cease to operate and simultaneously the ball valve 15 is allowed to close. The tractor can then be driven over uneven ground without any danger of the machine gradually dropping to the ground, as the ball valve 15 is held on its seat by its spring 16 and by the pressure within the hydraulic jack so that oil is effectively and automatically locked within the jack regardless of jolting of the tractor.

Figure 1:
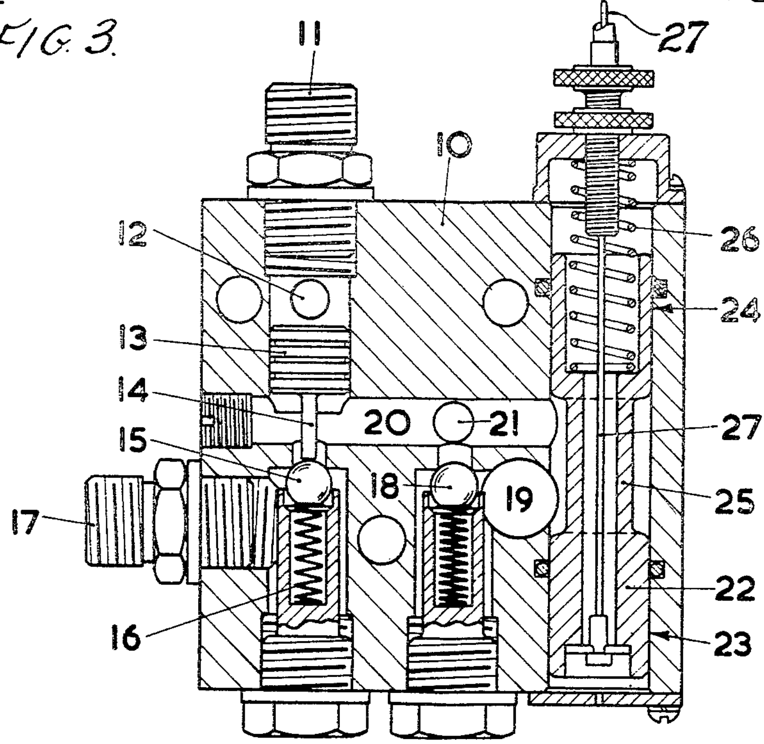
FIG. 1 is a section through valve means according to the invention.
Figure 2:
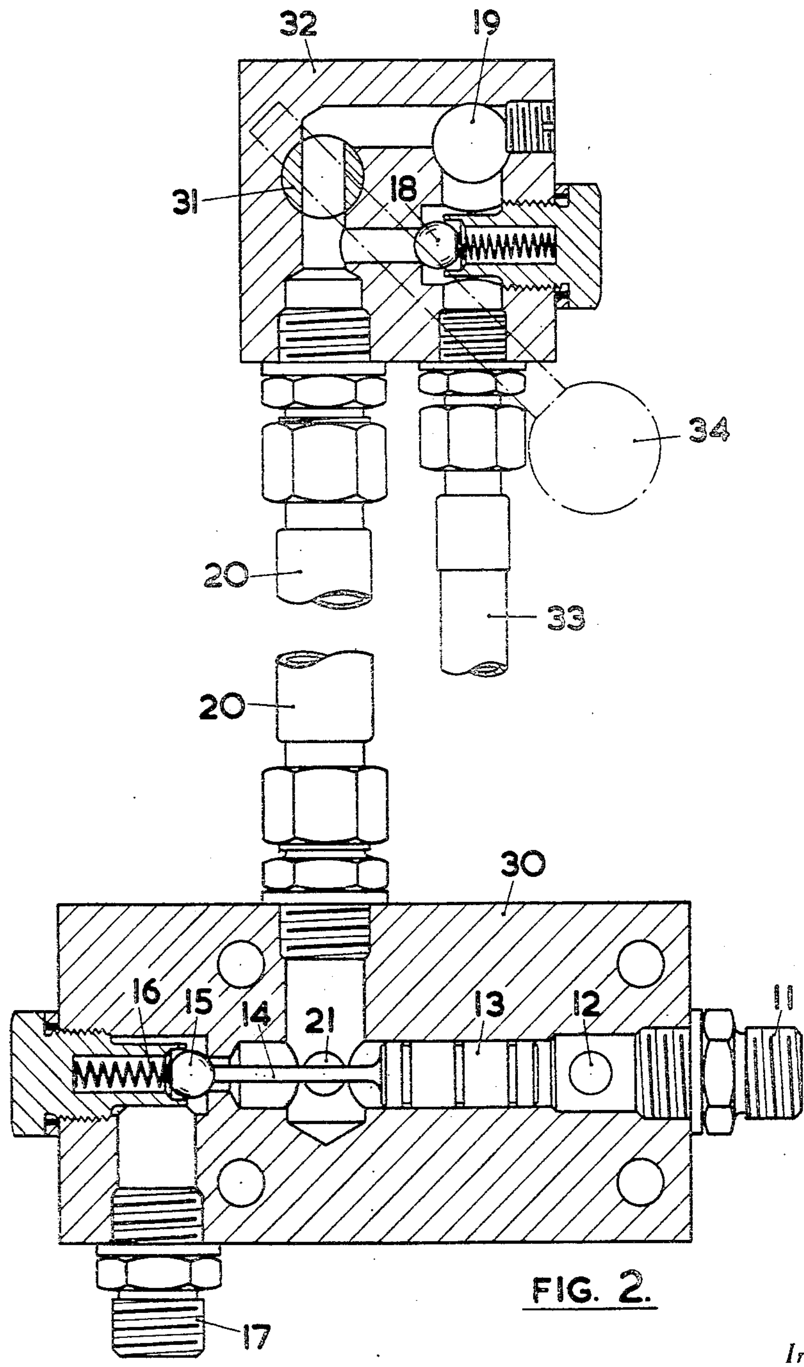
FIG. 2 is a section through slightly modified valve means.

Referring now to FIG. 2, parts corresponding to parts shown in FIG. 1 have been given the same reference numbers. In the modification, the supply port 11, the piston 13 and its pin 14, the ball valve 15 and its spring 16, and the port 17 on the down-stream side of said valve are contained in a valve block 30 secured to the hydraulic motor. The relief valve 18 and the exhaust port 19, together with a rotary valve 31 which replaces the slide valve, are contained in another valve block 32 adapted to be secured to the tractor. Four flexible pipes are required—one adapted to connect the supply port 11 to a pressure outlet of the tractor hydraulic mechanism; another, which constitutes the conduit 20, connecting the two valve blocks 30 and 32 together; a flexible drain pipe 33 from the hydraulic motor communicating directly with the exhaust port 19; and a fourth flexible pipe connecting the port 17 to the hydraulic jack. The exhaust jack. The exhaust port 19 is adapted to open directly into the sump of the tractor hydraulic mechanism. The rotary valve 31 is operable by a hand lever 34 to prevent or permit the escape of oil from the conduit 20 direct to the exhaust part 19. The principle of operation of this modified arrangement is precisely the same as that of the embodiment shown in FIG. 1.

As shown in FIGURE 3, which illustrates diagrammatically the valve means of FIGURE 1 incorporated into the mowing machine of said Patent No. 3,374,610 a knife-bar 40 is reciprocable upon a knife-bar bed 41 which is pivotally connected to a frame 42 mounted on the tractor. Reciprocation of the knife-bar is effected by means of a rotary hydraulic motor 43 mounted on frame 42 and a motion transmitting mechanism comprising a crank 44 and arm 45, a lever 46 and a link 47.

Pivotal movement of the knife-bar bed about its axis and raising of the frame are effected through a single acting hydraulic jack 48 which is pivotally connected at 49 to one arm of a bell crank 51 that in turn is pivoted on frame 42 at 52. Bell crank 51 is operably connected to knife-bar bed 41 by a rod 53 and a lever 54 pivotally connected to bed 41.

As shown the hydraulic system wherein the motor 43 and jack 48 are connected in series during operation comprises an oil sump 55 from which oil is drawn by a pump 56 to pump oil under pressure to supply port 11 of FIGURE 1, this oil under pressure passing through valve port 12 to motor inlet conduit 57. After passing through the motor 43 oil returns on conduit 58 to valve port 21. Valve port 17 is connected to jack 48 by a conduit 59. A return conduit 61 connects exhaust port 19 to sump 55. A valve 62 provides for selected actuation of the hydraulic system.

Reference is made to the disclosure of said Patent No. 3,374,610 for any further details of construction.

I claim:

1. A mowing machine comprising a frame, a knife-bar bed hinged to the frame, a knife-bar reciprocable on the bed, a hydraulic motor mounted on the machine and drivably connected to the knife-bar, a hydraulic jack for raising the machine, a hydraulic circuit connecting the hydraulic motor and the hydraulic jack in series, and means operable automatically when the supply of oil under pressure is cut off for positively locking oil under pressure within the hydraulic jack.

2. A mowing machine comprising a frame, a knife-bar bed hinged to the frame, a knife-bar reciprocable on the bed, a hydraulic motor mounted on the machine and drivably connected to the knife-bar, a hydraulic jack for raising the machine, a hydraulic circuit connecting the hydraulic motor and the hydraulic jack in series, and a non-return valve for positively locking oil under pressure within the hydraulic jack and forming part of valve means comprising a supply port communicating with the inlet of the hydraulic motor, a piston movable by oil pressure at the supply port to push the non-return valve off its seat against the action of a spring, a port on the downstream side of the non-return valve leading to the hydraulic jack, a spring closed maximum pressure relief valve, an exhaust port on the downstream side of the relief valve, a conduit connecting the outlet of the hydraulic motor to the upstream side of the non-return valve and the relief valve, and a manually controlled on/off valve for controlling the flow of oil from the conduit direct to the exhaust port.

3. A mowing machine comprising a frame, a knife-bar bed hinged to the frame, a knife-bar reciprocable on the bed, a hydraulic motor mounted on the machine and drivably connected to the knife-bar, a hydraulic jack for raising the machine, a hydraulic circuit connecting the hydraulic motor and the hydraulic jack in series, and a non-return valve for positively locking oil under pressure within the hydraulic jack and forming part of valve means contained in a single valve block secured to the hydraulic motor and comprising a supply port communicating with the inlet of the hydraulic motor, a piston movable by oil pressure at the supply port to push the non-return valve off its seat against the action of a spring, a port on the downstream side of the non-return valve leading to the hydraulic jack, a spring closed maximum pressure relief valve, and exhaust port on the downstream side of the relief valve, a conduit connecting the outlet of the hydraulic motor to the upstream side of the non-return valve and the relief valve, and a manually controlled on/off valve for controlling the flow of oil from the conduit direct to the exhaust port.

4. A mowing machine according to claim 3, wherein the manually controlled valve is a slide valve operable by a Bowden cable.

5. A mowing machine comprising a frame, a knife-bar bed hinged to the frame, a knife-bar reciprocable on the bed, a hydraulic motor mounted on the machine and drivably connected to the knife-bar, a hydraulic jack for raising the machine, a hydraulic circuit connecting the hydraulic motor and the hydraulic jack in series, and a non-return valve for positively locking oil under pressure within the hydraulic jack and forming part of valve means comprising a first valve block which is secured to the hydraulic motor and contains a supply port communicating with the inlet of the hydraulic motor, a piston movable by oil pressure at the supply port to push the non-return valve off its seat against the action of a spring, a port on the downstream side of the non-return valve leading to the hydraulic jack, and the outlet of the hydraulic motor which communicates with the upstream side of the non-return valve, a second valve block which is adapted to be secured to a tractor mounting the machine and contains a spring closed maximum pressure relief valve, an inlet communicating with the upstream side of the relief valve, an exhaust port on the downstream side of the relief valve, and a manually controlled on/off valve for controlling the flow of oil from the inlet direct to the exhaust port, and a conduit linking the first and second valve blocks and connecting the outlet of the hydraulic motor to the inlet of the second valve block.

6. A mowing machine according to claim 5, wherein the manually controlled valve is a rotary valve operable by a hand lever.

7. A mowing machine comprising a frame, a knife-bar bed hinged to the frame, a knife-bar reciprocable on the bed, a hydraulic motor mounted on the machine and drivably connected to the knife-bar, a hydraulic jack for raising the machine, a hydraulic actuating circuit containing hydraulic fluid under pressure and for connecting and operating the hydraulic motor and jack in series, and means for automatically positively locking hydraulic fluid under pressure within the hydraulic jack when said motor is not being operated.

8. In the mowing machine defined in claim 7, said last means being responsive to hydraulic pressure in said circuit.

References Cited

UNITED STATES PATENTS

| | | | |
|---|---|---|---|
| 2,324,563 | 7/1943 | Custenborder | 56—25 |
| 2,588,002 | 3/1952 | Holmes | 56—25 |
| 2,828,598 | 4/1958 | Anderson et al. | 56—25 |

ANTONIO F. GUIDA, Primary Examiner